(12) United States Patent
Matsuhira et al.

(10) Patent No.: US 8,289,466 B2
(45) Date of Patent: Oct. 16, 2012

(54) LIQUID CRYSTAL DISPLAY DEVICE, AND MANUFACTURING METHOD FOR THE LIQUID CRYSTAL DISPLAY DEVICE

(75) Inventors: Tsutomu Matsuhira, Chiba (JP); Tomoko Matsuhira, legal representative, Chiba (JP); Masayuki Ichino, Chiba (JP); Yoichi Kagaya, Chiba (JP); Isamu Hashizume, Chiba (JP)

(73) Assignee: Seiko Instruments Inc. (JP)

( * ) Notice: Subject to any disclaimer, the term of this patent is extended or adjusted under 35 U.S.C. 154(b) by 826 days.

(21) Appl. No.: 12/319,376

(22) Filed: Jan. 7, 2009

(65) Prior Publication Data

US 2009/0185101 A1 Jul. 23, 2009

(30) Foreign Application Priority Data

Jan. 9, 2008 (JP) ................. 2008-002453

(51) Int. Cl.
*G02F 1/1333* (2006.01)

(52) U.S. Cl. ........................................ 349/58; 349/158

(58) Field of Classification Search .................. None
See application file for complete search history.

(56) References Cited

U.S. PATENT DOCUMENTS

| 5,583,681 | A | * | 12/1996 | Shioya et al. | 349/60 |
| 6,067,133 | A | * | 5/2000 | Niibori et al. | 349/60 |
| 7,068,343 | B2 | * | 6/2006 | Saitoh | 349/158 |
| 8,026,996 | B2 | * | 9/2011 | Matsuhira et al. | 349/60 |
| 2003/0184704 | A1 | * | 10/2003 | Akiyama et al. | 349/158 |

* cited by examiner

*Primary Examiner* — Thanh-Nhan P Nguyen
(74) *Attorney, Agent, or Firm* — Adams & Wilks

(57) ABSTRACT

In a manufacturing method for a liquid crystal display device, a translucent first adhesive is placed between a first surface of a substrate and a display surface of a liquid crystal panel so that the first adhesive covers the entire surface of the liquid crystal panel. The first adhesive is cured to bond the substrate and the liquid crystal panel. The bonded substrate and liquid crystal panel are positionally aligned relative to a backlight unit. A second adhesive is placed between the substrate and the backlight unit so that the second adhesive surrounds an outer peripheral end portion of the liquid crystal panel. The first adhesive is cured to integrally bond the substrate, liquid crystal panel, and backlight unit to each other.

10 Claims, 8 Drawing Sheets

A PLACEMENT STEP
Fig. 1A  (a 1)  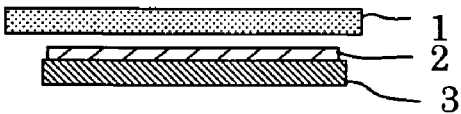
Fig. 1B  (a 2)  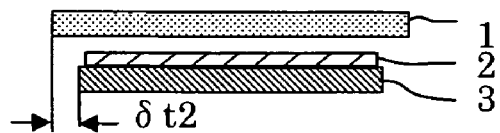
Fig. 1C  (a 3)  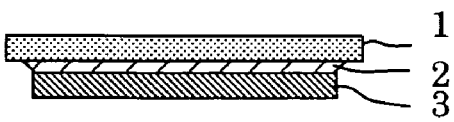
B FIRST ALIGNMENT STEP
Fig. 1D  (b 1)  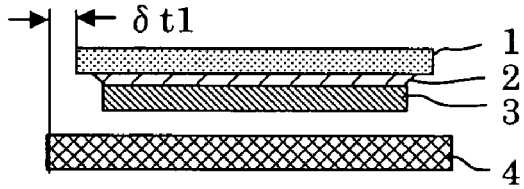
Fig. 1E  (b 2)  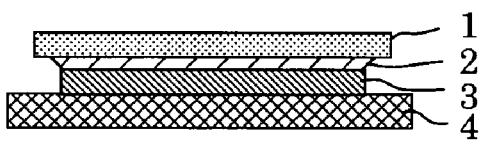
C BONDING STEP

A PLACEMENT STEP
Fig. 2A (a4) 
Fig. 2B (a5) 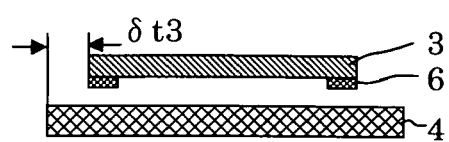
Fig. 2C (a6) 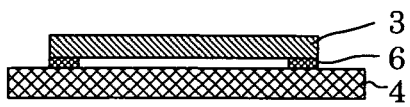
B FIRST ALIGNMENT STEP
Fig. 2D (b1) 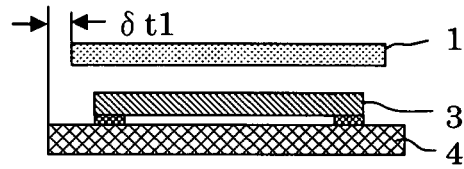
Fig. 2E (b2) 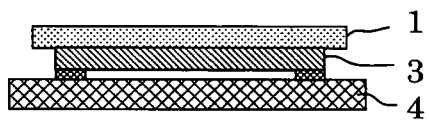
C BONDING STEP Fig. 3
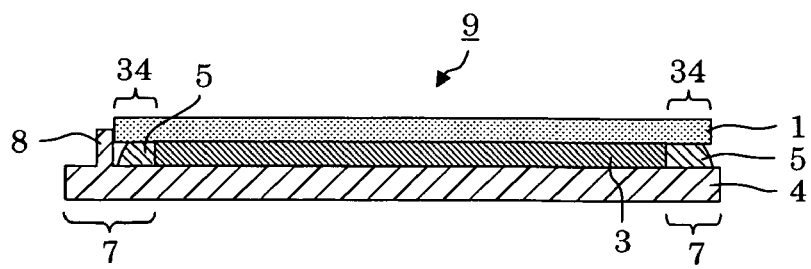

LIQUID CRYSTAL DISPLAY DEVICE, AND MANUFACTURING METHOD FOR THE LIQUID CRYSTAL DISPLAY DEVICE

BACKGROUND OF THE INVENTION

1. Field of the Invention

The present invention relates to a liquid crystal display device with a structure in which a liquid crystal panel is sandwiched between a translucent front substrate and a backlight unit, a manufacturing method for the liquid crystal display device, and an electronic apparatus using the liquid crystal display device.

2. Description of the Related Art

A liquid crystal display device is widely used for a display unit of an electronic apparatus such as a laptop personal computer, a cellular phone, a PDA, and an electronic dictionary. The liquid crystal display device includes a non-emissive liquid crystal panel, a backlight provided on a back surface side of the liquid crystal panel for illuminating the same, a front glass provided on a display surface side of the liquid crystal panel, and the like. A method of bonding the liquid crystal panel and the front substrate on the display surface side thereof to each other by using an adhesive is disclosed, for example, in WO 2007/063751 and JP H09-274536 A.

For the purpose of allowing a user to view the liquid crystal display device, an opening portion for exposing the liquid crystal display device therefrom is provided on a cabinet of the electronic apparatus. In the case of placing the liquid crystal display device on the electronic apparatus, it is necessary to assemble a display surface of the liquid crystal display device to the opening portion of the cabinet while performing highly accurate positional alignment for both thereof. This is because an exterior appearance of the display unit is deteriorated when an interval between a parting line of the display unit of the liquid crystal display device and an end portion of the opening portion of the cabinet is widened or narrowed. In the cellular phone taken as an example, a maximum allowable tolerance of an attachment position of the liquid crystal display device onto the cabinet is approximately ±0.4 mm.

FIGS. 13A to 13F illustrate a conventional method of assembling the liquid crystal display device including the backlight and the liquid crystal panel to cabinet of such a portable apparatus. FIG. 13A is a cross-sectional view schematically illustrating a state of preparing a front glass 54 and a liquid crystal panel 53 and attaching both thereof to each other while performing positional alignment therefor. A step difference portion 55 is provided on a display viewed-side surface of the front glass 54, and this step difference portion 55 is formed so as to fit into an opening of an upper cabinet of the portable apparatus. The liquid crystal panel 53 includes a liquid crystal cell 50, an upper polarization plate 51 attached onto a display viewed-side surface thereof, and a lower polarization plate 52 attached onto a back surface thereof, which is opposite to the upper polarization plate 51. The liquid crystal cell 50 has a configuration in which a liquid crystal layer is provided between two glass substrates bonded to each other while interposing a seal member (not shown) therebetween. On an inner surface of one of the two glass substrates, TFTs, pixel electrodes individually connected to the respective TFTs, and the like are formed. On an inner surface of the other substrate, color filters are formed so as to correspond to the respective pixel electrodes.

FIG. 13B is a schematic cross-sectional view illustrating a state where the front glass 54 and the liquid crystal panel 53 are bonded to each other by an optical adhesive 56. Before or after the positional alignment step, the adhesive is applied on the liquid crystal panel 53 or the front glass 54, and the front glass 54 and the liquid crystal panel 53 are positionally aligned with each other and bond to each other. A transparent adhesive of a thermosetting type, a UV-curing or a visible light-curing is used as the optical adhesive 56. The optical adhesive 56 is filled between the liquid crystal panel 53 and the front glass 54, and accordingly, impact resistance and stress resistance of the liquid crystal panel 53 are enhanced.

FIG. 13C is a schematic cross-sectional view illustrating a state of positionally aligning a plastic frame 58 and the liquid crystal panel 53 with each other. The plastic frame 58 includes an LED 61 as a light source, a light guide plate 59 that guides light emitted from the LED 61, a reflection plate 60 provided on a back surface of the light guide plate 59, and an optical film 57 placed on a front surface of the light guide plate 59. Grooves are formed on the front surface of the light guide plate 59, and the liquid crystal panel 53 is irradiated with the light reflected on the grooves. The optical film 57 is provided for efficiently irradiating the liquid crystal panel 53 with the light emitted from the front surface of the light guide plate 59, and for example, the optical film 57 includes a light diffusion plate and a lens film.

In the plastic frame 58, there are provided: a housing portion that houses the reflection plate 60 and the light guide plate 59 on which the optical film 57 is placed; and a step difference 66 for housing the liquid crystal panel 53 in the housing portion. The step difference 66 is formed so that a bottom surface thereof can be flush with a surface of the optical film 57. A light-shielding double-sided adhesive tape 62 is placed on the bottom surface of the step difference 66.

FIG. 13D is a schematic cross-sectional view illustrating a state where the liquid crystal panel 53 and the plastic frame 58 are bonded to each other by the light-shielding double-sided adhesive tape 62. FIG. 13E is a schematic cross-sectional view illustrating a state where the plastic frame 58 is placed on a lower cabinet 64 of the portable apparatus. The lower cabinet 64 and the plastic frame 58 are fixed to each other through an intermediation of a fixing portion 63. For example, pins provided on the lower cabinet 64 are fitted to holes provided in the plastic frame 58.

FIG. 13F is a schematic cross-sectional view illustrating a state where the upper cabinet 65 of the portable apparatus is placed on the step difference portion 55 on the surface of the front glass 54. At this time, gaps $\delta d1$ and $\delta d2$ are formed between an end portion of the upper cabinet 65 and the step difference portion 55. In the electronic apparatus such as the cellular phone, it is necessary to set those gaps, for example, at ±0.4 mm or less.

In such a manufacturing method as described above, the sum of the gaps $\delta d1$ and $\delta d2$ is equal to the sum of a positional alignment tolerance a between the front glass 54 and the liquid crystal panel 53 in the step of FIG. 13A, a positional alignment tolerance b between the plastic frame 58 and the liquid crystal panel 53 in the step of FIG. 13C, and a positional alignment tolerance c between the lower cabinet 64 and the plastic frame 58 in the step of FIG. 13E. Therefore, it has become difficult to suppress a gap between the front glass 54 and the upper cabinet 65, for example, within ±0.4 mm, and the exterior appearance of the display unit has been deteriorated. Actually, only by adding the tolerance a and the tolerance b together, the sum thereof has exceeded ±0.4 mm.

Further, though it is probable that the above-mentioned problem may be avoided when the front glass 54 onto which the liquid crystal panel is bonded is bonded onto the upper cabinet 65, the front glass 54 and the liquid crystal panel 53 are subjected to breakage in this case since strength of the upper cabinet 65 is low. Such breakage is caused by the fact that a stress applied to the upper cabinet 65 is directly applied to the front glass 54 and the liquid crystal panel 53. In particular, as illustrated in FIGS. 13A to 13F, in the case of providing the collar-like step difference portion 55 on a peripheral portion of the front glass 54, the step difference portion 55, which is thin, is prone to break. Further, there has been a problem that the liquid crystal display device cannot be thinned in the case of thickening the front glass 54 for the purpose of ensuring strength of the whole device.

Further, in the case of enlarging the front glass 54 more than an outer shape of the liquid crystal panel 53 and fixing the front glass 54 and the lower cabinet 64 to each other by an adhesive, there has been a problem that it becomes difficult to reassemble the liquid crystal panel 53, resulting in that maintenance and the like cannot be performed for the liquid crystal panel.

SUMMARY OF THE INVENTION

Under the above-mentioned circumstances, the present invention provides a manufacturing method for a liquid crystal display device including: a placement step of placing the liquid crystal panel between the front substrate and the backlight unit; a first alignment step of positionally aligning the front substrate and the backlight unit with each other; and a bonding step of bonding the front substrate, the backlight unit and the liquid crystal panel to one another by a first adhesive.

In this case, the placement step includes: an adhesive placement step of placing a translucent adhesive between a display surface side of the liquid crystal panel and the front substrate; a second positional alignment step of positionally aligning the front substrate and the liquid crystal panel with each other such that the front substrate can protrude outward from one of an entire and a part of an outer peripheral end portion of the liquid crystal panel when viewed from above; and an adhesive curing step of curing the filled translucent adhesive.

Alternatively, the placement step includes: an adhesive bonding step of applying a second adhesive onto one of a back surface of the liquid crystal panel, the back surface being opposite to a display surface side of the liquid crystal panel, and a surface of the backlight unit on a liquid crystal panel side thereof such that the second adhesive can go along one of an entire and a part of an outer periphery of the liquid crystal panel; a third positional alignment step of positionally aligning the backlight unit and the liquid crystal panel with each other such that the backlight unit can protrude outward from one of an entire and a part of an outer peripheral end portion of the liquid crystal panel when viewed from above; and a liquid crystal panel bonding step of mounting the liquid crystal panel on the backlight unit so as to bond the liquid crystal panel to the backlight unit by the second adhesive.

Further, in the liquid crystal display device of the present invention, a liquid crystal panel is sandwiched and fixed between a front substrate and a backlight unit, in which: the front substrate includes a protruding portion protruding outward from an outer periphery of the liquid crystal panel when viewed from above; the backlight unit includes an extended portion extended outward from the protruding portion of the front substrate when viewed from the above, the extended portion comprising a protruding portion for allowing the protruding portion to abut thereonto and positioning the front substrate with respect to the backlight unit; and an adhesive is filled between the protruding portion of the front substrate and the extended portion of the backlight unit, the front substrate, the liquid crystal panel, and the backlight unit being bonded and fixed integrally with one another by the adhesive. Further, a translucent adhesive is filled between the front substrate and the liquid crystal panel.

Alternatively, the liquid crystal panel and the backlight unit are bonded to each other by an adhesive seal having a predetermined width so that the adhesive seal can go along one of a part and an entire of an outer periphery of the liquid crystal panel.

The liquid crystal display device as described above is housed in a cabinet, whereby an electronic apparatus can be constructed. In this case, the cabinet includes a lower cabinet and an upper cabinet, the liquid crystal display device is sandwiched between the lower cabinet and the upper cabinet, the upper cabinet includes a window portion in a region corresponding to a display surface of the liquid crystal display device, and an elastic body is filled between the vicinity of the window portion of the upper cabinet and the extended portion of the backlight unit.

BRIEF DESCRIPTION OF THE DRAWINGS

In the accompanying drawings:

FIGS. 1A to 1F are process views illustrating an example of a manufacturing method for a liquid crystal display device according to the present invention;

FIGS. 2A to 2F are process views illustrating another example of the manufacturing method for the liquid crystal display device according to the present invention;

FIG. 3 is a schematic cross-sectional view illustrating a liquid crystal display device according to the present invention;

DETAILED DESCRIPTION OF THE PREFERRED EMBODIMENTS

Figure 1F:
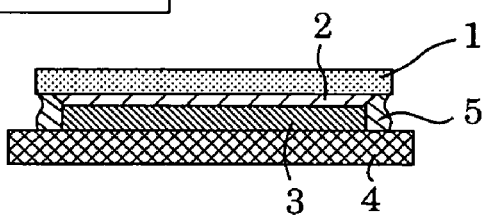

A manufacturing method for a liquid crystal display device of the present invention includes: a placement step of placing a liquid crystal panel between a translucent front substrate and a backlight unit; a first alignment step of performing positional alignment between the front substrate and the backlight unit; and a bonding step of filling a first adhesive between the front substrate and the backlight unit and bonding the front substrate, the backlight unit, and the liquid crystal panel integrally to one another by the first adhesive. Here, in the placement step, the liquid crystal panel may be positionally aligned with the front substrate, and the liquid crystal panel and the front substrate may bond to each other, or alternatively, the liquid crystal panel may be positionally aligned with the backlight unit, and the liquid crystal panel and the backlight unit may be bonded to each other. Further, in the first alignment step, positional alignment for an outer shape of the front substrate or the backlight unit may be performed with reference to the backlight unit or the front substrate, or alternatively, a protruding portion may be formed on an outer peripheral end portion of the backlight unit, and the front substrate may be positionally aligned with the backlight unit by allowing an end portion of the front substrate to abut on this protruding portion.

The liquid crystal display device is manufactured as described above, whereby the front substrate is positionally aligned with reference to the backlight unit. Hence, when the backlight unit is placed on a cabinet of a portable apparatus, a positional tolerance in the case of fixing the liquid crystal panel is not contained in a positional tolerance of the front substrate with respect to the cabinet. As a result, the front substrate can be placed on the cabinet with high accuracy.

Further, the adhesive filled between the front substrate and the end portion of the backlight unit functions as a reinforcing member. Specifically, a stress applied from the front substrate side is transmitted to the backlight unit side through the adhesive. Similarly, a stress applied from the backlight unit side is transmitted to the front substrate side through the adhesive. As described above, the stress or impact, which is applied from any one of the front substrate side and the backlight unit side, is transmitted to the other member thereof. Accordingly, strength of the entire liquid crystal display device is enhanced in this case more than in the case of receiving the stress on only the front substrate or only on the backlight unit. The strength of the liquid crystal display device is enhanced, and hence the manufacturing method for the liquid crystal display device according to the present invention has an advantage in that the liquid crystal panel, the front substrate, and the backlight unit can be thinned more.

The above-mentioned method is specifically described with reference to FIGS. 1A to 2F. FIGS. 1A to 1F illustrate an example of the manufacturing method for the liquid crystal display device according to the present invention, and are explanatory views of a manufacturing method, in which a liquid crystal panel 3 and a front substrate 1 are first bonded to each other, and the liquid crystal panel 3 is thereafter fixed to a backlight unit 4. FIGS. 2A to 2F illustrate another example of the manufacturing method for the liquid crystal display device according to the present invention, and are explanatory views of a manufacturing method, in which the liquid crystal panel 3 and the backlight unit 4 are first bonded to each other, and the front substrate 1 and the liquid crystal panel 3 are thereafter bonded to each other.

Description is made of the former method with reference to FIGS. 1A to 1F. A placement step A includes an adhesive placement step a1, a second positional alignment step a2, and an adhesive curing step a3. First, in the adhesive placement step a1 illustrated in FIG. 1A, a translucent adhesive 2 is placed between the liquid crystal panel 3 and the front substrate 1. A UV-curing or visible light-curing adhesive or room temperature-curing or thermosetting adhesive can be used as the translucent adhesive.

In the second positional alignment step a2 illustrated in FIG. 1B, the front substrate 1 is positionally aligned with the liquid crystal panel 3 so as to protrude outward from the entire or a part of an outer peripheral end portion of the liquid crystal panel 3. The front substrate 1 has at least a size sufficient to cover a display surface of the liquid crystal panel 3. A collar-like step difference portion for receiving an end portion of an upper cabinet may be formed on a front surface of the front substrate 1. Further, on a back surface of the front substrate 1, a display parting frame print or tape may be placed. The liquid crystal panel 3 or the front substrate 1 is fixed to a surface plate or the like, and the outer peripheral edge portion of the front substrate 1 or the liquid crystal panel 3 is positioned. A tolerance between the front substrate 1 and the liquid crystal panel 3 at this time is defined as $\delta t2$.

In the adhesive curing step a3 illustrated in FIG. 1C, the front substrate 1 is dropped down, the translucent adhesive 2 is sandwiched by the front substrate 1 and the liquid crystal panel 3, and the translucent adhesive 2 is cured.

Note that, in the placement step A, a translucent liquid adhesive and a translucent adhesive sheet can be used as the translucent adhesive 2. In the case of using the liquid adhesive, a procedure may be adopted, in which the liquid adhesive is coated on the surface of any one of the front substrate 1 and the liquid crystal panel 3 in the adhesive placement step a1, the front substrate 1 and the liquid crystal panel 3 are next stacked on each other and the liquid adhesive is filled between both thereof, and the front substrate 1 and the liquid crystal panel 3 are thereafter aligned with each other by the second positional alignment step a2. Further, in the case of using the translucent liquid adhesive, a procedure may be adopted in which the front substrate 1 and the liquid crystal panel 3 are first aligned with each other by the second positional alignment step a2, the liquid adhesive is next applied between the front substrate 1 and the liquid crystal panel 3 from the end portions thereof by the adhesive placement step a1 by using the capillary phenomenon, and the liquid adhesive is thereafter cured by the adhesive curing step a3.

In FIGS. 1A to 1F, a first alignment step B illustrated in FIGS. 1D and 1E includes a positional alignment step b1 and a mounting step b2. In the positional alignment step b1, the backlight unit 4 and the front substrate 1 are positionally aligned with each other. In a state where the backlight unit 4 is fixed, the end portion of the front substrate 1 is positionally aligned therewith by using a jig. A tolerance between the front substrate 1 and the backlight unit 4 at this time is defined as $\delta t1$. Alternatively, a procedure may be adopted, in which a protruding portion for the positional alignment is formed on an outer peripheral portion of the backlight unit 4, and the front substrate 1 is positionally aligned with the backlight unit 4 by allowing the end portion of the front substrate 1 to abut on the protruding portion. Next, in the mounting step b2 illustrated in FIG. 1E, the front substrate 1 is mounted on the backlight unit 4. In the case of such mounting, the liquid crystal panel 3 and the backlight unit 4 may be fixed to each other by an adhesive or an adhesive sheet as described above.

As illustrated in FIG. 1F, in a bonding step C, a first adhesive 5 is filled between the front substrate 1 and the backlight unit 4. By the first adhesive 5, the end portion of the front substrate 1, the end portion of the liquid crystal panel 3, and the end portion of the backlight unit 4 are bonded and fixed integrally with one another. A black or colored adhesive can be used as the first adhesive 5 for the purpose of shielding light leaked from the backlight unit 4. The first adhesive 5 may be filled so as to surround the entire periphery of the liquid crystal panel 3. Alternatively, in the case where the liquid crystal panel 3 has a rectangular shape, the first adhesive 5 may be filled into one side of such a rectangle or into two sides thereof opposite to each other.

As described above, the entire surface of the liquid crystal panel 3 is bonded onto the front substrate 1 by the translucent adhesive 2, whereby, even in the case where a thickness of the liquid crystal panel 3 is thin, such impact resistance that is less likely to cause breakage thereof against an external stress can be enhanced.

Next, description is made of the manufacturing method for the present invention with reference to FIGS. 2A to 2F. As illustrated, a placement step A includes an adhesive application step a4, a third positional alignment step a5, and a liquid crystal panel bonding step a6. First, in the adhesive application step a4 illustrated in FIG. 2A, a second adhesive 6 is applied onto the entire or a part of an outer periphery of a back surface of the liquid crystal panel 3. A double-sided adhesive tape or a pressure-sensitive tape can be used as the second adhesive 6. Next, in the third positional alignment step a5 illustrated in FIG. 2B, the end portion of the liquid crystal panel 3 is positioned with respect to the backlight unit 4. A tolerance between the liquid crystal panel 3 and the backlight unit 4 at this time is defined as $\delta_{t3}$. With regard to such positioning, the backlight unit 4 may be fixed to the surface plate or the like, and the end portion of the liquid crystal panel 3 may be positioned by using the jig or the like. Alternatively, the liquid crystal panel 3 may be positioned so as to align a positional alignment mark of the backlight unit 4 and a positional alignment mark of the liquid crystal panel 3 with each other. In the liquid crystal panel bonding step a6 illustrated in FIG. 2C, the liquid crystal panel 3 is mounted on the backlight unit 4, and the liquid crystal panel 3 is fixed to the backlight unit 4 by the second adhesive 6. Note that, though the third positional alignment step a5 is performed after the second adhesive 6 is applied onto the back surface of the liquid crystal panel 3 in the adhesive application step a4, in place of this, the second adhesive 6 may be applied onto the surface of the backlight unit 4 in the adhesive application step a4, and the third positional alignment step a5 may be performed.

In FIGS. 2D and 2E, a first alignment step B includes a positional alignment step b1 and a mounting step b2. In the positional alignment step b1 illustrated in FIG. 2D, the backlight unit 4 and the front substrate 1 are positionally aligned with each other. In a state where the backlight unit 4 is fixed, the end portion of the front substrate 1 is positionally aligned therewith by using the jig. A tolerance between the front substrate 1 and the backlight unit 4 at this time is defined as $\delta_{t1}$. Alternatively, a procedure may be adopted, in which the protruding portion for the positional alignment is formed on the outer peripheral portion of the backlight unit 4, and the front substrate 1 is positionally aligned with the backlight unit 4 by allowing the end portion of the front substrate 1 to abut on the protruding portion. Next, in the mounting step b2 illustrated in FIG. 2E, the front substrate 1 is mounted on the backlight unit 4. In the case of such mounting, the liquid crystal panel 3 and the backlight unit 4 may be fixed to each other by the adhesive or the adhesive sheet.

Figure 2F:
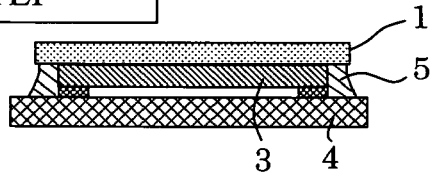

In a bonding step C illustrated in FIG. 2F, the first adhesive 5 is filled between the front substrate 1 and the backlight unit 4. By the first adhesive 5, the end portion of the front substrate 1, the end portion of the liquid crystal panel 3, and the end portion of the backlight unit 4 are bonded and fixed integrally with one another. The black or colored adhesive can be used as the first adhesive 5 for the purpose of shielding the light leaked from the backlight unit 4. The first adhesive 5 may be filled so as to surround the entire periphery of the liquid crystal panel 3. Alternatively, in the case where the liquid crystal panel 3 has a rectangular shape, the first adhesive 5 may be filled into one side of such a rectangle or into two sides thereof opposite to each other.

As described above, according to the manufacturing methods illustrated in FIGS. 1A to 1F and FIGS. 2A to 2F, the tolerance $\delta_{t2}$ of the position of the liquid crystal panel 3 with respect to the front substrate 1 is not contained in the tolerance $\delta_{t1}$ of the position of the front substrate 1 with respect to the backlight unit 4. Therefore, the front substrate 1 can be positioned with respect to the cabinet of the electronic apparatus with high accuracy. Further, the first adhesive 5 is filled to the outer peripheral portions between the front substrate 1 and the backlight unit 4. Therefore, the stress applied to the front substrate 1 or the backlight unit 4 can be received on the backlight unit 4 side or the front substrate 1 side, which are opposite thereto, respectively, and the impact resistance can be enhanced.

FIG. 3 is a schematic cross-sectional view illustrating a liquid crystal display device according to the present invention. The same portions or portions having the same functions are denoted by the same reference symbols. As illustrated, a liquid crystal panel 3 is sandwiched between a front substrate 1 and a backlight unit 4. The front substrate 1 includes a protruding portion (first protruding portion) 34 that protrudes outward from an outer periphery of the liquid crystal panel 3 when viewed from the above. The backlight unit 4 includes an extended portion 7 extending outward from the protruding portion 34 of the front substrate 1 when viewed from the above. This extended portion 7 includes a protruding portion (second protruding portion) 8 for positioning the front substrate 1 with respect to the backlight unit 4 by abutting on an end portion of the protruding portion 34 of the front substrate 1. The end portion of the protruding portion 34 abuts on the protruding portion 8 of the backlight unit 4, whereby a relative position of the front substrate 1 to the backlight unit 4 is determined. Hence, the front substrate 1 can be positioned so as not to contain a positional tolerance of the liquid crystal panel 3. A first adhesive 5 is filled between the protruding portion 34 of the front substrate 1 and the extended portion 7 of the backlight unit 4, and the front substrate 1, the outer peripheral end portion of the liquid crystal panel 3, and the backlight unit 4 are bonded and fixed integrally with one another.

As illustrated in FIGS. 1A to 3, the adhesive is filled between the peripheral portions of the front substrate 1 and the backlight unit 4 while including the end portion of the liquid crystal panel 3, and the adhesive is cured, whereby the liquid crystal display device is strengthened against a compression stress and a tensile stress, which are applied between the front substrate 1 and the backlight unit 4. In the case where an upper substrate side of the liquid crystal panel 3 is bonded onto the front substrate 1, and a lower substrate side of the liquid crystal panel 3 is bonded onto the backlight unit 4, when the tensile stress is applied between the front substrate 1 and the backlight unit 4, upper and lower substrates of the liquid crystal panel 3 become prone to be peeled off from a seal portion that attaches the upper and lower substrates to each other. Such peeling of the upper and lower substrates can be prevented by the adhesive filled between the peripheral portions.

Note that, in the above-mentioned configuration, a glass substrate or a substrate made of a plastic material such as an acrylic resin (PMMA: methyl methacrylate resin) and a polycarbonate resin can be used as the front substrate 1. Further, a touch panel can be used as the front substrate 1. A collar-like step difference portion for fitting a window end portion of the cabinet onto a peripheral portion of the front surface of the front substrate can be formed. A display parting black tape for the liquid crystal panel 3 can be attached onto a peripheral portion of the back surface of the front substrate. In the case of installing the liquid crystal display device to the electronic apparatus, the step difference portion and a parting portion are positionally aligned with the end portion of the cabinet highly accurately.

An active matrix liquid crystal panel and a passive-matrix liquid crystal panel can be used as the liquid crystal panel 3. The active matrix liquid crystal panel has a structure, in which liquid crystal is sealed between two glass substrates, and polarization plates are attached onto outer surfaces. In the active matrix liquid crystal panel, a TFT matrix array is formed on an inner surface of one of the two glass substrates, and color filters are formed on an inner surface of the other substrate. In the passive-matrix liquid crystal panel, stripe-like transparent electrodes are formed on inner surfaces of two glass substrates. Thin plates with a thickness of 0.15 mm to 0.3 mm can be used as the two glass substrates. The upper polarization plate is attached onto the front surface of the liquid crystal panel 3, and the lower polarization plate is attached onto the back surface thereof.

A sidelight-type backlight can be used as the backlight unit 4. The sidelight-type backlight includes: a light guide plate having light-scattering irregularity portion provided on a surface thereof; an LED for introducing light from an end portion of the light guide plate into the light guide plate; a diffusion plate or a prism sheet, which is formed on a surface of the light guide plate, and serves for controlling a direction of the light irradiated from the light guide plate; and a plastic frame that integrally incorporates those therein. Further, a direct-type backlight can be used, in which a cold cathode fluorescent tube, and the diffusion plate or the prism sheet, which serves for scattering light of the cold cathode fluorescent tube, are incorporated in the plastic frame. The sidelight-type backlight can be formed to have a thickness as thin as 0.3 mm to 0.5 mm.

Description is made below in detail of embodiments according to the present invention with reference to FIGS. 4A to 12C.

Figure 4A:
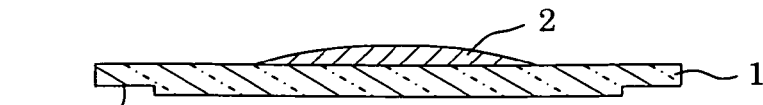
FIGS. 4A to 4F are process views illustrating a manufacturing method for a liquid crystal display device according to Embodiment 1 of the present invention.

(Embodiment 1) FIGS. 4A to 4F illustrate a flow of a manufacturing method for a liquid crystal display device. FIG. 4A is a cross-sectional view schematically illustrating a state where a front substrate 1 is inverted and a translucent adhesive 2 is coated on a back surface thereof. A glass plate with a thickness of approximately 1.0 mm is used as the front substrate 1. On a peripheral portion of a display viewed-side surface of the front substrate 1, a step difference portion 26 for fitting an end portion of an upper cabinet 22 thereonto is formed. Onto a peripheral portion of the back surface of the front substrate 1, a display parting portion (not shown) is printed, or a display parting sheet (not shown) is attached. The front substrate 1 is inverted upside down, and the translucent adhesive 2 made of a UV-curing adhesive is coated on the back surface of the front substrate 1 (adhesive placement step a1 of the placement step A).

Figure 4B:
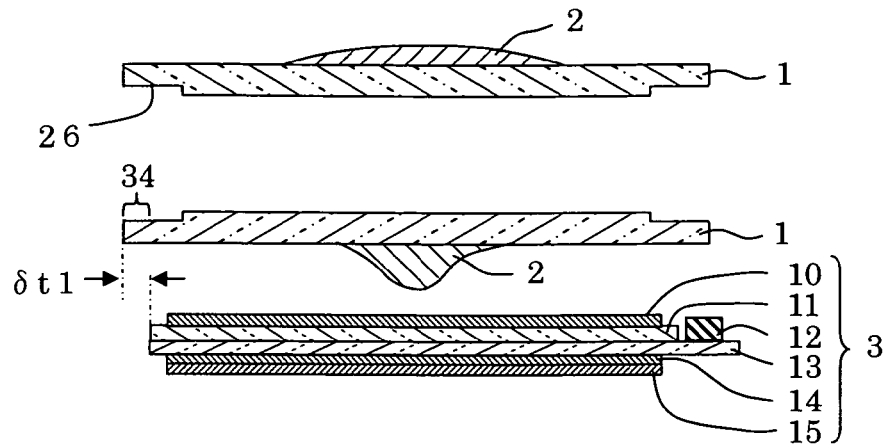

FIG. 4B is a cross-sectional view schematically illustrating a state of inverting the front substrate 1 upside down and performing positional alignment for bonding a liquid crystal panel 3 thereonto. The liquid crystal panel 3 includes: a liquid crystal element, in which an upper substrate 11 made of glass with a thickness of approximately 0.25 mm and a lower substrate 13 made of glass with a thickness of approximately 0.25 mm are bonded to each other while interposing a seal member (not shown) therebetween, and liquid crystal is sealed into an inner space formed of the upper and lower substrates 11 and 13 and the seal member; an upper light absorption-type polarization plate 10 attached onto an outer surface of the upper substrate 11; a lower light absorption-type polarization plate 14 attached onto an outer surface of the lower substrate 13; a light reflection-type polarization plate 15 attached onto a lower surface of the lower light absorption-type polarization plate 14; and a driver IC 12 packaged on an inner surface-side end portion of the lower substrate 13.

The front substrate 1 is inverted upside down, and the translucent adhesive 2 coated on the previous front surface thereof is made like a dripping liquid by gravity. The front substrate 1 constitutes a protruding portion 34 which protrudes in plan view and has a size larger than that of the liquid crystal panel 3 on three sides thereof other than a side along which the driver IC 12 is placed. Then, the liquid crystal panel 3 and the front substrate 1 are positionally aligned with each other. A tolerance between the liquid crystal panel 3 and the front substrate 1 at this time is defined as $\delta_{f2}$ (second positional alignment step a2 of the placement step A).

Figure 4C:
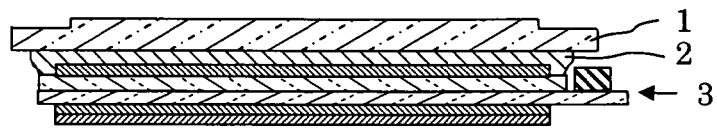

FIG. 4C is a schematic cross-sectional view of a state where the front substrate 1 and the liquid crystal panel 3 are bonded to each other by the translucent adhesive 2. From the state of FIG. 4B, the front substrate 1 is lowered at a speed at which a ripple does not occur on a surface of the dripping liquid-like translucent adhesive 2, and is brought into point contact with a surface of the liquid crystal panel 3. Then, the front substrate 1 is further lowered, whereby the translucent adhesive 2 is entirely filled between the liquid crystal panel 3 and the front substrate 1. Thereafter, an ultraviolet ray is irradiated onto the translucent adhesive 2, whereby the translucent adhesive 2 is cured (adhesive curing step a3 of the placement step A).

Figure 4D:
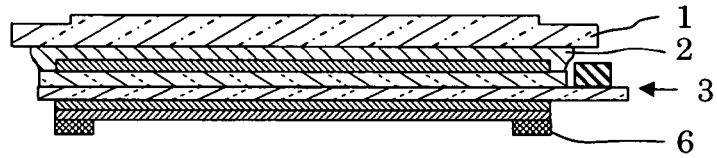

FIG. 4D is a schematic cross-sectional view of a state where the second adhesive 6 is placed on an outer periphery of a lower portion of the liquid crystal panel 3. A light-shielding double-sided adhesive tape with a thickness of approximately 0.02 mm to 0.1 mm is used as the second adhesive 6. A front surface of the second adhesive 6 is colored black, and a back surface thereof is colored white for the purpose of reflecting light irradiated from an LED 19. The second adhesive 6 is attached onto the liquid crystal panel 3 so as to surround a display region of the liquid crystal panel 3 in a square shape. Alternatively, the second adhesive 6 can be attached while leaving one side of the liquid crystal panel 3 open in a U-shape.

Figure 4E:
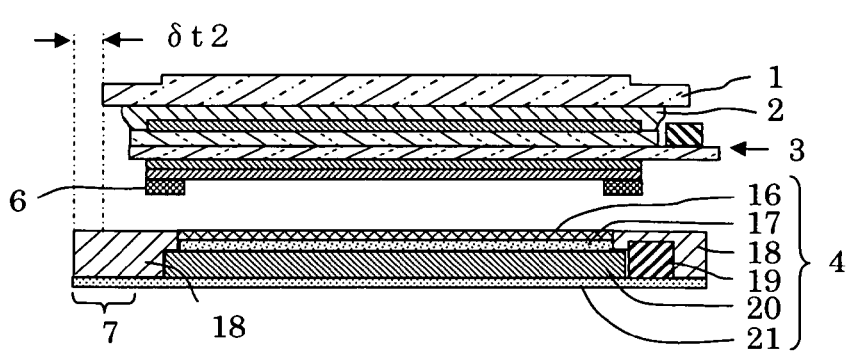

FIG. 4E is a schematic cross-sectional view of a state of positionally aligning a backlight unit 4 and the front substrate 1 with each other. The backlight unit 4 includes: the LED 19; a light guide plate 20 for guiding light from the LED 19 and irradiating the light upward; a reflection plate 21 for reflecting upward light leaked from the light guide plate 20 downward; a diffusion film 17 and a lens film 16, which are attached onto an upper portion of the light guide plate 20, and serve for controlling a direction of the light emitted from the light guide plate 20; and a plastic frame 18 that houses those members. A thickness of the light guide plate 20 is approximately 0.25 mm, a thickness of the diffusion film is approximately 40 μm, a thickness of the lens film is approximately 64 μm, and a thickness of the backlight unit 4 is approximately 0.3 to 0.5 mm. A polycarbonate resin, an acrylic resin, and the like can be used as the liquid guide plate 20 and the plastic frame 18. The reflection plate 21 includes a reflection surface on which silver or aluminum is deposited.

Except for a side along which the driver IC 12 is placed, an outer shape of the backlight unit 4 is larger than an outer shape of the liquid crystal panel 3. Further, the outer shape of the backlight unit 4 is larger the entire periphery of the front substrate 1. A region of the backlight unit 4, which protrudes outward from the liquid crystal panel 3, including a portion extended outward from the front substrate 1 when viewed from the above, is defined as an extended portion 7. Note that it is not always necessary to enlarge the backlight unit 4 more than the entire periphery of the front substrate 1, and the extended portion 7 may also be formed on a part thereof. The backlight unit 4 is formed so as to be adapted to the portable apparatus for which the backlight unit 4 is used.

The front substrate 1 and the backlight unit 4 are positionally aligned with each other by positionally aligning the protruding portion 34 of the front substrate 1 with respect to the backlight unit 4. The front substrate 1 is positionally aligned with reference to the backlight unit 4. When a tolerance therebetween is defined as δt1, δt1 can be suppressed to be ±0.1 mm or less (positional alignment step b1 of the first alignment step B).

Figure 4F:
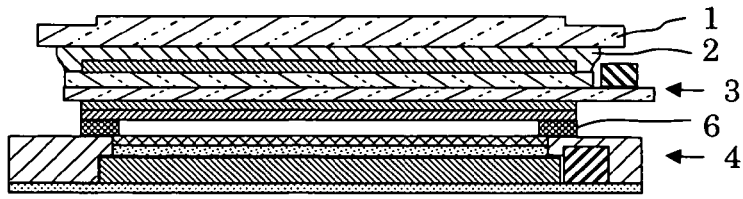

FIG. 4F is a schematic cross-sectional view of a state where the backlight unit 4 and the liquid crystal panel 3 are bonded to each other. The second adhesive 6 is bonded to adjacent portions of an upper surface of the plastic frame 18 of the backlight unit 4 and an upper surface of the lens film 16 (mounting step b2 of the first alignment step B).

Figure 5A:
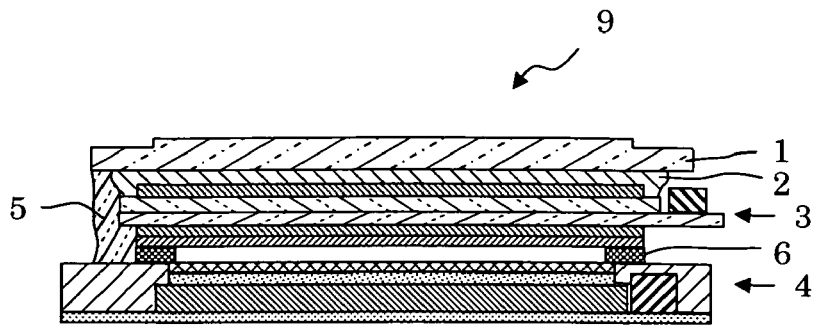
FIGS. 5A and 5B are process views illustrating the manufacturing method for the liquid crystal display device according to Embodiment 1 of the present invention.

Next, a first adhesive 5 is filled between the end portions of the front substrate 1 and the backlight unit 4, and bonds both of the front substrate 1 and the backlight unit 4 to each other, whereby a liquid crystal display device 9 is formed. FIG. 5A illustrates a schematic cross-sectional view of this state. The first adhesive 5 is filled along the three sides other than the side along which the driver IC 12 is packaged. The second adhesive 6 inhibits the first adhesive 5 from entering a gap between the backlight unit 4 and the liquid crystal panel 3. This is because, when the first adhesive 5 enters the gap between the backlight unit 4 and the liquid crystal panel 3, a lens effect of the lens film 16 for the light is changed, and it becomes impossible for the lens film 16 to exert an initial function thereof. Hence, the second adhesive 6 also functions as a breakwater for the first adhesive 5 (bonding step C).

Figure 5B:
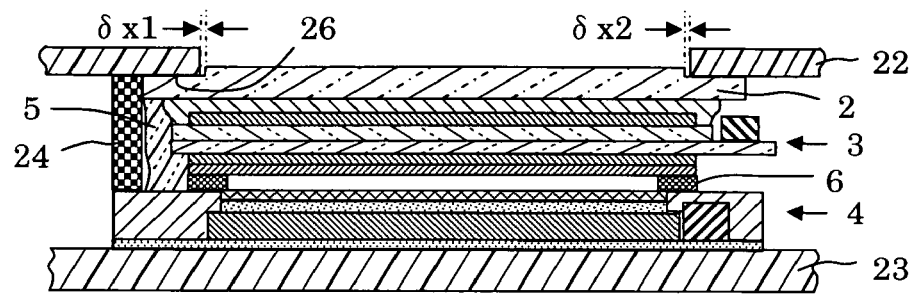

FIG. 5B is a schematic cross-sectional view of a state where the liquid crystal display device 9 is incorporated into the portable apparatus. The liquid crystal display device 9 is placed on a lower cabinet 23 of the portable apparatus. Next, an upper cabinet 22 is placed on the liquid crystal display device 9. An elastic body 24 is interposed between the front substrate 1 and the extended portion of the backlight unit 4, whereby a stress applied to the upper cabinet 22 and the lower cabinet 23 is dispersed. An end portion of the upper cabinet 22 is placed on the step difference portion 26 of the front substrate 1. In this case, distances $δ_{x1}$ and $δ_{x2}$ between the end portion of the upper cabinet 22 and the step difference of the protruding portion 34 can be restricted within ±0.4 mm. This is because the tolerance $δ_{t2}$ of the case of placing the liquid crystal panel 3 is not contained in the tolerance $δ_{t1}$.

Note that, though the backlight unit 4 and the front substrate 1 are positionally aligned with each other after the second adhesive 6 is provided on the outer periphery of the lower portion of the liquid crystal panel 3 in FIG. 4D, in place of this, the backlight unit 4 and the front substrate 1 may be positionally aligned with each other after providing the second adhesive 6 on the backlight unit 4.

Figure 6:
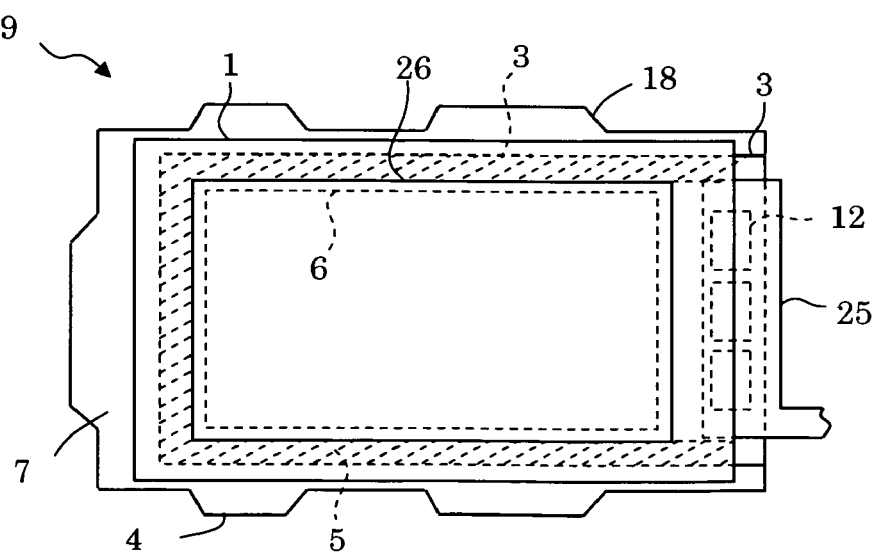
FIG. 6 is a schematic plan view of the liquid crystal display device according to Embodiment 1 of the present invention.

FIG. 6 is a schematic top view of the liquid crystal display device 9. This liquid crystal display device 9 corresponds to the liquid crystal display device 9 in the manufacturing step of FIG. 5A. A region surrounded by the step difference portion 26 of the front substrate 1 is the display region. An inner periphery of the second adhesive 6 constitutes a parting line of the display unit. The first adhesive 5 is filled between the outer periphery of the liquid crystal panel 3 and the outer periphery of the front substrate 1. The region of the backlight unit 4, which protrudes from the outer periphery of the front substrate 1, constitutes the extended portion 7. On the inner surface of the lower substrate 13 on which the driver IC 12 is packaged, a flexible substrate 25 for connecting the driver IC 12 to an external drive circuit (not shown) is placed.

Note that, in this embodiment, for the front substrate 1, a plastic material such as an acrylic resin and a touch panel may be used. The driver IC 12 is COG-packaged on the inner surface of the lower substrate 13. However, the upper substrate 11 may be placed on the lower side, and the lower substrate 13 may be placed on the upper side. Further, the driver IC 12 may be COF-packaged. Further, the upper light absorption-type polarization plate 10 of the liquid crystal panel 3 may be attached onto the lower surface side of the front substrate 1, and the lower light absorption-type polarization plate 14 and the light reflection-type polarization plate 15 may be attached onto the backlight unit 4. Further, though the first adhesive 5 is filled along the end portions of the three sides along which the driver IC 12 is not placed, for example, the first adhesive 5 may be filled along the two upper and lower sides, or may be filled along any one of the sides. Essentially, the front substrate 1 just needs to be positioned with respect to the backlight unit 4, and in any portion, the first adhesive just needs to be filled between the front substrate 1 and the backlight unit 4, and the end portions of the front substrate 1, the backlight unit 4, and the liquid crystal panel 3 just need to be fixed to one another.

Figure 7A:
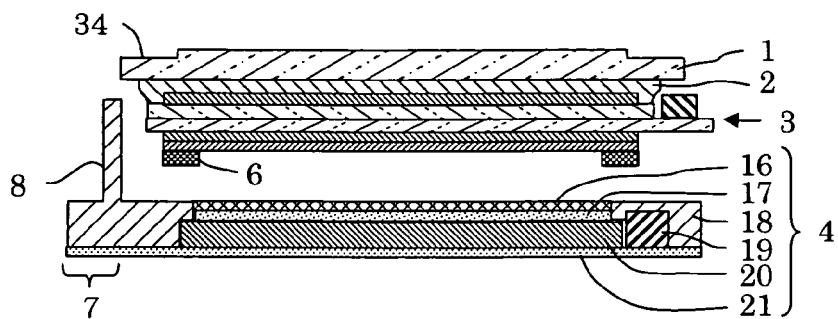
FIGS. 7A to 7C are process views illustrating a manufacturing method for a liquid crystal display device according to Embodiment 2 of the present invention.
Figure 7B:
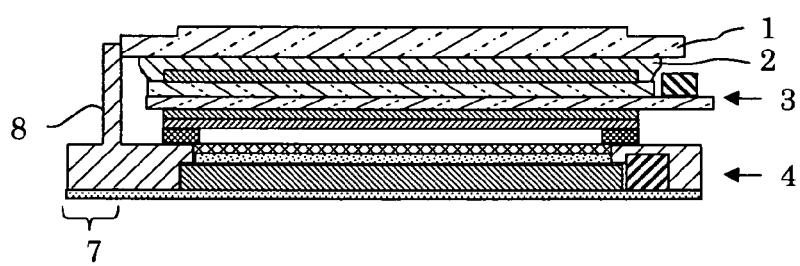
Figure 7C:
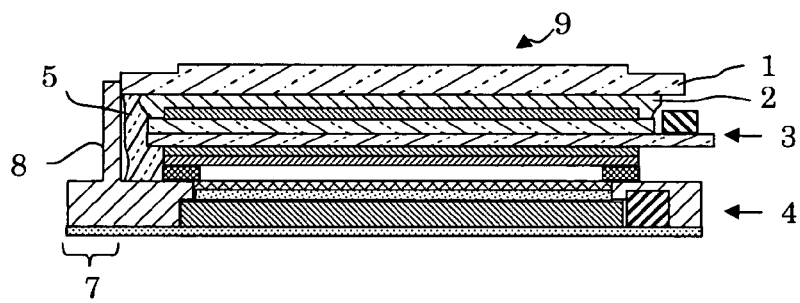

(Embodiment 2) FIGS. 7A to 7C illustrate a flow of a manufacturing method for a liquid crystal display device. The steps of bonding a front substrate 1 and a liquid crystal panel 3 to each other by a translucent adhesive 2 and placing a second adhesive 6 on an outer peripheral portion of a lower surface of the liquid crystal panel 3 are similar to those of Embodiment 1 described with reference to FIGS. 4A to 6, and accordingly, description thereof is omitted. The same portions or portions having the same functions are denoted by the same reference symbols.

FIG. 7A is a schematic cross-sectional view illustrating a first positional alignment step B. The liquid crystal panel 3 and the front substrate 1 are bonded and fixed to each other by the translucent adhesive 2 filled therebetween. Onto an outer peripheral surface of the liquid crystal panel 3 on a backlight unit 4 side, the second adhesive 6 is attached. In the backlight unit 4, an LED 19, a light guide plate 20, a diffusion film 17, and a lens film 16 are incorporated in a plastic frame 18. Onto a back surface of the backlight unit 4, a reflection plate 21 is attached. Protruding portions 8 are formed on an extended portion 7 of the plastic frame 18. The protruding portions 8 are provided for allowing a protruding portion 34 of the front substrate 1 to abut thereonto and positioning the front substrate 1 with respect to the backlight unit 4. A height of the protruding portions 8 is set at a height at which the protruding portions 8 do not protrude upward from a surface of a step difference portion 26 of the front substrate 1 when the front substrate 1 is placed on the backlight unit 4. For positioning the front substrate 1 with respect to the backlight unit 4, the front substrate 1 onto which the liquid crystal panel 3 is lowered, and an end portion of the protruding portion 34 of the front substrate 1 is allowed to abut on the protruding portions 8 (positional alignment step b1 of the first alignment step B). A tolerance between the front substrate 1 and the backlight unit 4 is defined as $δ_{t1}$.

FIG. 7B is a schematic cross-sectional view illustrating a state where the liquid crystal panel 3 and the backlight unit 4 are bonded to each other. The protruding portion 34 is allowed to abut on the protruding portions 8, and the liquid crystal panel 3 is mounted on the second adhesive 6 (mounting step b2 of the first alignment step B). Next, the liquid crystal panel 3 and the backlight unit 4 are bonded to each other, whereby the liquid crystal panel 3 is fixed (bonding step C). FIG. 7C is a schematic cross-sectional view of a state where a first adhesive is filled between the protruding portion 34 of the front substrate 1 and the extended portion 7 of the backlight unit 4. After the liquid crystal panel 3 is bonded onto the backlight unit 4, the first adhesive 5 is filled between the protruding portion 34 and the extended portion 7, and the adhesive is cured. In such a way, the front substrate 1, the backlight unit 4, and the liquid crystal panel 3 are fixed integrally with one another. The first adhesive 5 filled between the protruding portion 34 and the extended portion 7 is dammed by the second adhesive 6, and does not enter a gap between the liquid crystal panel 3 and the backlight unit 4.

Note that, though the backlight unit 4 and the front substrate 1 are positioned with respect to each other after the second adhesive 6 is provided on the outer periphery of the lower portion of the liquid crystal panel 3 in FIG. 7A, in place of this, the backlight unit 4 and the front substrate 1 may be positioned with respect to each other after the second adhesive 6 is provided on the surface of the backlight unit 4.

Figure 8:
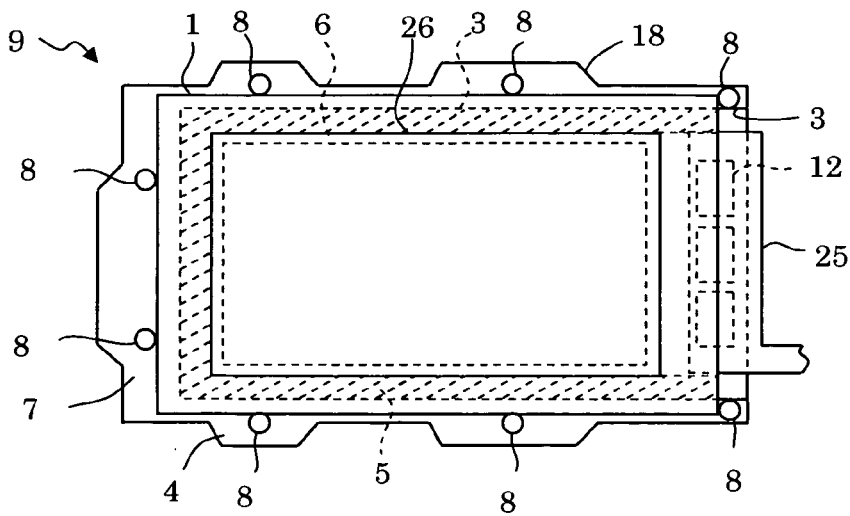
FIG. 8 is a schematic plan view of the liquid crystal display device according to Embodiment 2 of the present invention.

FIG. 8 is a top view schematically illustrating the liquid crystal display device 9 illustrated in FIG. 7C. The columnar protruding portions 8 are placed on the extended portion 7 of the backlight unit 4. Other configurations are similar to those in FIG. 6, and accordingly, description thereof is omitted. Two pieces of the protruding portions 8 are formed on each side of the periphery of the front substrate 1, and an inner side of the front substrate 1 is fitted onto the protruding portions 8. Note that, though two pieces of the protruding portions 8 are provided on each side of the four sides of the front substrate 1, in place of this, two pieces of the protruding portions 8 may be formed on each side of the following pair of the sides, which is: the upper side and the left side; the lower side and the left side; the upper side and the right side; or the upper side and the left side. Alternatively, the protruding portions 8 may be formed on spots more than those. Further, a shape of the protruding portions 8 is not limited to the columnar shape, and the protruding portions 8 may be formed into a prismatic shape or a wall shape.

Figure 9:
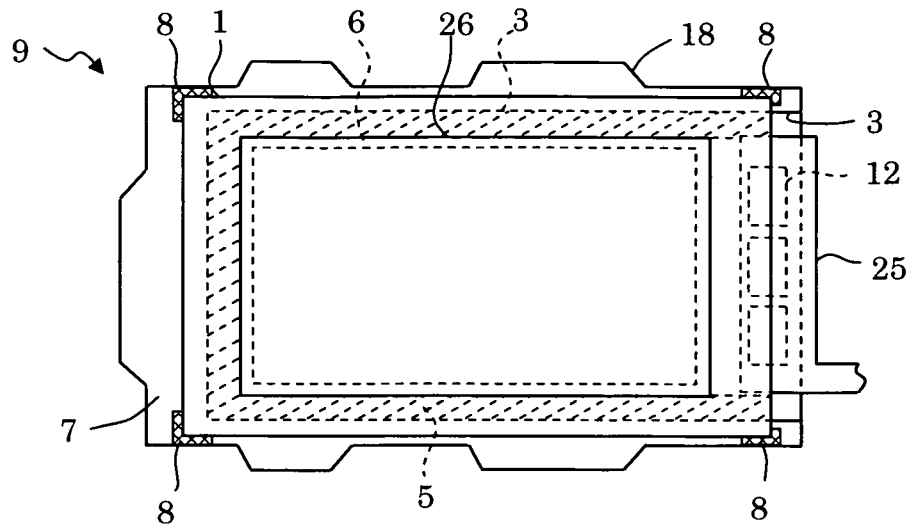
FIG. 9 is a schematic plan view of a liquid crystal display device according to Embodiment 3 of the present invention.

(Embodiment 3) FIG. 9 is a schematic plan view of the liquid crystal display device 9 illustrated in FIG. 7C. In FIG. 9, protruding portions 8 are different from those in FIG. 8. In this case, the protruding portions 8 are formed at positions corresponding to four corners of the front substrate 1, and the respective protruding portions 8 have a hook-like columnar shape. Similarly to a procedure illustrated in FIGS. 7A to 7C, the front substrate 1 is placed on the backlight unit 4 by being fitted onto the protruding portions 8 on those four corners. Therefore, positioning accuracy between the front substrate 1 and the backlight unit 4 can be enhanced. Note that, in place of forming the protruding portions 8 on the four corners, the protruding portions 8 may be placed on three corners or two corners of the front substrate 1. Further, quadrangular prisms can be erected as the protruding portions 8 on at least two sides of the front substrate 1, and can be used as guide portions for the positional alignment of the front substrate 1.

Figure 10:
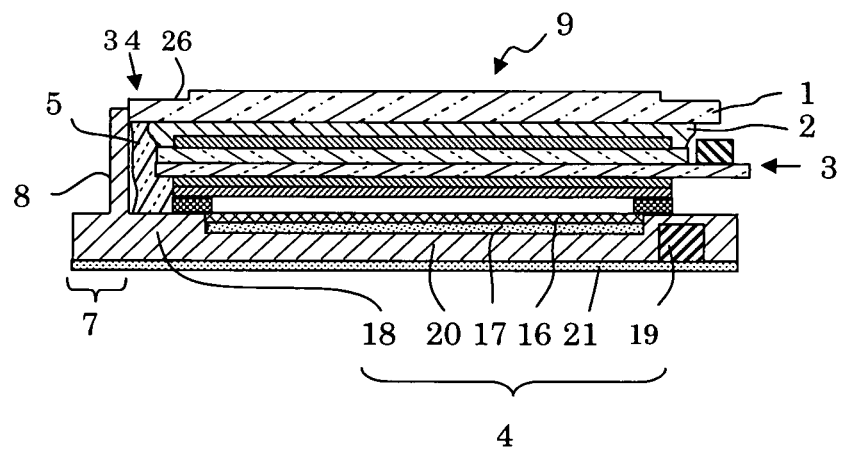
FIG. 10 is a schematic cross-sectional view of a liquid crystal display device according to Embodiment 4 of the present invention.

(Embodiment 4) FIG. 10 schematically illustrates a configuration of a liquid crystal display device 9 according to this embodiment. In this case, the configuration of the liquid crystal display device 9 of this embodiment is different from that of the liquid crystal display device 9 in Embodiment 2 illustrated in FIG. 7B in a structure of the backlight unit 4. Otherwise, a front substrate 1 and a liquid crystal panel 3 are similar to those in FIG. 7B, and accordingly, description thereof is omitted. The same reference numerals are assigned to the same portions or portions having the same functions.

In FIG. 10, in the backlight unit 4, a light guide plate 20 and a plastic frame 18 are formed integrally with each other by using a translucent material made of a polycarbonate resin or the like. A recessed portion is formed on a portion of the plastic frame 18, which corresponds to the light guide plate 20, and an LED 19 is housed in an end portion of the plastic frame 18. A diffusion film 17 and a lens film 16 are housed in the recessed portion. A reflection plate 21 is attached onto a back surface of the plastic frame 18. On an extended portion 7 of the plastic frame 18, which is extended from an end portion of the front substrate 1 when viewed from the above, a protruding portion 8 for positioning the front substrate 1 is formed. In the plastic frame 18, on an end portion of the extended portion 7, which is opposite to the LED 19, white ink (not shown) is formed, and light emitted from the LED 19 is allowed to be reflected thereon. As described above, the plastic frame 18 and light guide plate 20 of the backlight unit 4 are formed integrally with each other, and accordingly, strength of the backlight unit 4 is enhanced. As a result, the backlight unit 4 can be formed to be thinner. In the plastic frame 18, the frame itself, the light guide plate 20, the protruding portion 8, and the like can be formed integrally with one another by injection molding, and accordingly, the number of manufacturing steps can be reduced.

Figure 11:
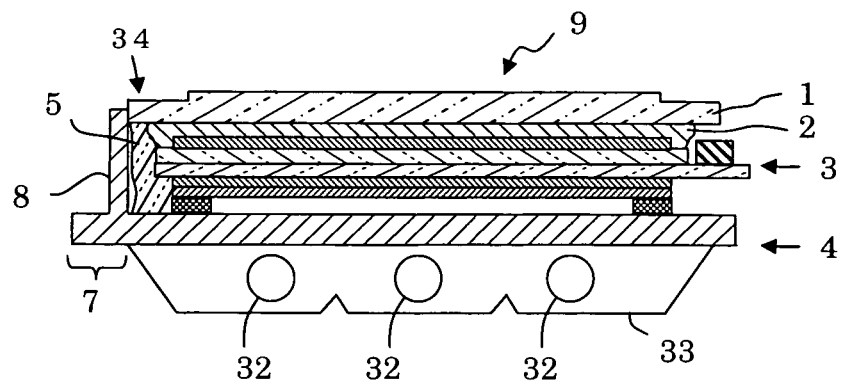
FIG. 11 is a schematic cross-sectional view of a liquid crystal display device according to Embodiment 5 of the present invention.

(Embodiment 5) FIG. 11 schematically illustrates a configuration of a liquid crystal display device 9 according to this embodiment. The configuration of the liquid crystal display device 9 of this embodiment is different from that of the liquid crystal display device 9 in Embodiment 2 illustrated in FIG. 7B in a structure of the backlight unit 4. In this case, a display surface has a size, for example, of 10 inches or more. Otherwise, a front substrate 1 and a liquid crystal panel 3 are similar to those in FIG. 7B, and accordingly, description thereof is omitted. The same reference numerals are assigned to the same portions or portions having the same functions.

In FIG. 11, the backlight unit 4 includes: a plastic frame 18; cold cathode fluorescent tubes 32 placed on a back surface of the plastic frame 18; and a reflection cover 33 that covers the cold cathode fluorescent tubes 32. In the plastic frame 18, on a surface of a region thereof corresponding to the liquid crystal panel 3, irregularities are formed so as to diffusely reflect light thereon. On an extended portion 7 of the plastic frame 18, which is extended from a protruding portion 34 of the front substrate 1 when viewed from the above, a protruding portion 8 is formed. The front substrate 1 can be assembled to the backlight unit 4 while allowing the protruding portion 34 of the front substrate 1 to abut on the protruding portion 8. Therefore, positioning accuracy of the front substrate 1 with respect to the backlight unit 4 can be enhanced. Further, in comparison with the sidelight-type backlight, a liquid crystal display panel with a large area can be allowed to display brightly.

Figure 12A:
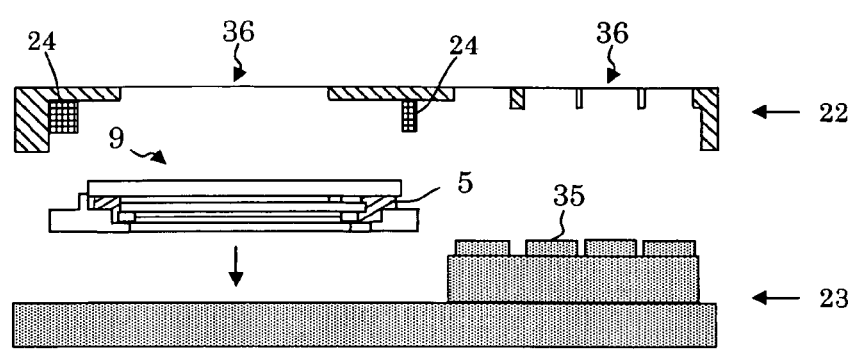
FIGS. 12A to 12C are process views illustrating a manufacturing method for an electronic apparatus according to Embodiment 6 of the present invention.
Figure 12B:
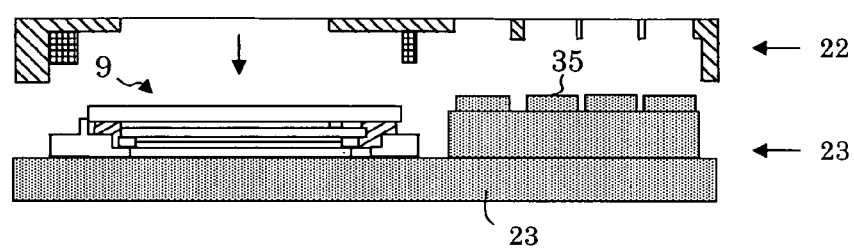
Figure 12C:
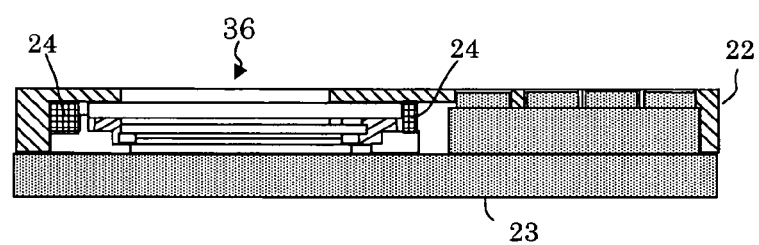
Figure 13A:
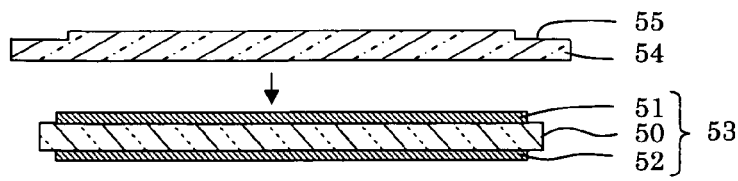
FIGS. 13A to 13F are process views illustrating a manufacturing method for a liquid crystal display device conventionally known in public.
Figure 13B:
Figure 13C:
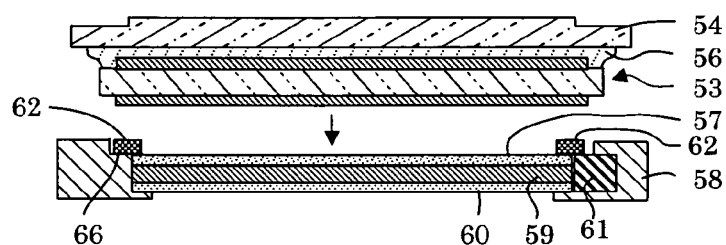
Figure 13D:
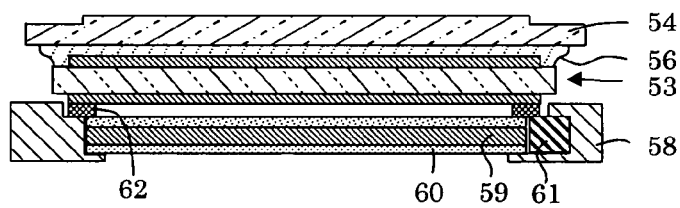
Figure 13E:
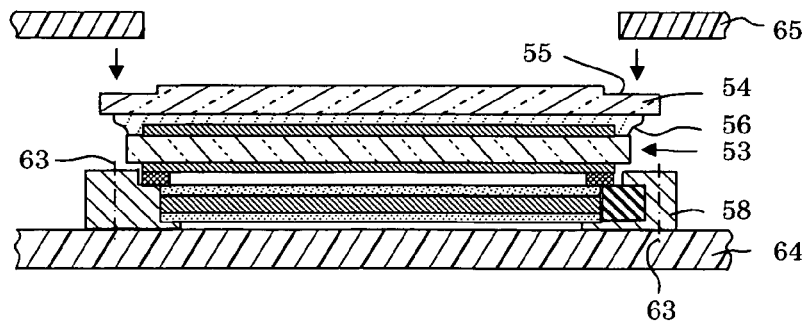
Figure 13F:
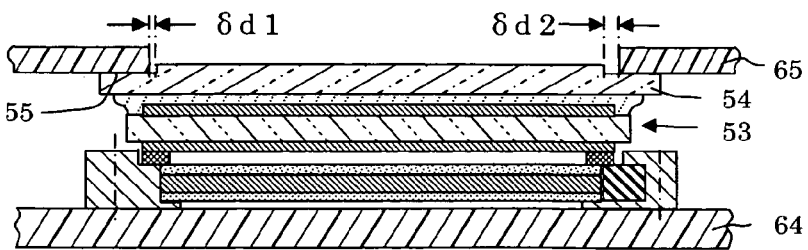

(Embodiment 6) FIGS. 12A to 12C are schematic cross-sectional views of an electronic apparatus 30 including a cellular phone in which the liquid crystal display device according to Embodiments 1 to 4 is incorporated. The same reference numerals are assigned to the same portions or portions having the same functions.

FIG. 12A schematically illustrates a configuration of the electronic apparatus 30 before assembling an upper cabinet 22, the liquid crystal display device 9 and a lower cabinet 23 to one another. A plurality of opening portions 36 are formed in a region of the upper cabinet 22, which corresponds to the display unit of the liquid crystal display device 9, and in a region thereof corresponding to input keys 35 for operation. A plurality of elastic bodies 24 for holding the liquid crystal display device 9 from the upper cabinet 22 is attached onto the upper cabinet 22. FIG. 12B is a cross-sectional view schematically illustrating a state where the liquid crystal display device 9 is attached onto the lower cabinet 23. The plastic frame 18 is fixed to the lower cabinet 23 by fitting recessed or protruding portions (not shown) formed on the plastic frame 18 of the backlight unit 4 to protruding or recessed portions (not shown) formed on the lower cabinet 23. Alternatively, the plastic frame 18 may be fixed to the lower cabinet 23 by screws and the like.

FIG. 12C is a schematic cross-sectional view of the electronic apparatus, illustrating a state where the upper cabinet 22 is placed on the lower cabinet 23 while including the liquid crystal display device 9 therebetween. The front substrate 1 of the liquid crystal display device 9 is fixed with reference to the backlight unit 4. A positional shift between the front substrate 1 and end portions of the opening portions 36 is reduced, whereby the exterior appearance of the display unit is enhanced. Further, the stress applied to the upper cabinet 22 and the lower cabinet 23 is received by the lower cabinet 23 and the upper cabinet 22 through the first adhesive 5, whereby the strength of the liquid crystal display device 9 is enhanced. Therefore, it becomes possible to form the liquid crystal display device 9 to be thinner.

As described above, in the present invention, the front substrate, the liquid crystal panel, and the backlight unit are bonded integrally with one another by the adhesive after the positional alignment between the translucent front substrate and the backlight unit is performed. Therefore, the positional tolerance between the backlight unit and the front substrate can be reduced. In addition, the external force applied to the front substrate or the backlight unit is transmitted to the backlight unit or the front substrate through the adhesive. Therefore, the impact resistance can be enhanced. The present invention has advantages as described above.

What is claimed is:

1. A manufacturing method for a liquid crystal display device having a liquid crystal panel mounted between a translucent front substrate and a backlight unit, the front substrate having a protruding portion protruding outward from an outer periphery of the liquid crystal panel the manufacturing method comprising:
    a first step of filling a translucent adhesive between the front substrate and an entire display surface of the liquid crystal panel, the front substrate being larger than the liquid crystal panel, the first step further comprising, after the filling of the translucent adhesive, a positional alignment step of positionally aligning the front substrate and the liquid crystal panel relative to each other such that the protruding portion of the front substrate protrudes outward from an outer peripheral end portion of the liquid crystal panel, and an adhesive curing step of curing the translucent adhesive filled between the liquid crystal panel and the front substrate after the alignment step;
    a second step of positionally aligning the front substrate and the backlight unit relative one another;
    a third step of applying an adhesive between the front substrate and the backlight unit so as to surround the liquid crystal panel; and
    a fourth step of curing the adhesive between the front substrate and the backlight unit to bond the liquid crystal panel to the front substrate and the backlight unit integrally with one another.

2. A manufacturing method for a liquid crystal display device according to claim 1; wherein the liquid crystal panel is configured for attachment to a flexible substrate for connection to an external drive circuit; and
    wherein the third step comprises applying the adhesive along side edge portions of the liquid crystal panel other than along a side edge portion configured for attachment to the flexible substrate.

3. A manufacturing method for a liquid crystal display device according to claim 1; wherein the backlight unit comprises an extended portion having protruding portions; and wherein the second step comprises positionally aligning the front substrate and the backlight unit relative to one another by bringing an end portion of the front substrate into abutment with the protruding portions of the backlight unit.

4. A liquid crystal display device comprising:
    a front substrate having a first protruding portion;
    a liquid crystal panel;
    a translucent adhesive filled between the front substrate and the liquid crystal panel so as to cover an entire display surface of the liquid crystal panel;
    a backlight unit having an extended portion extending outwardly from the first protruding portion of the front substrate, the extended portion comprising a second protruding portion configured to abut with the first protruding portion for positioning the front substrate with respect to the backlight unit; and
    an adhesive filled between the first protruding portion of the front substrate and the second protruding portion of the backlight unit so as to surround the liquid crystal panel, the front substrate, the liquid crystal panel, and the backlight unit so that the liquid crystal panel, front substrate and backlight unit are integrally bonded with one another by the adhesive.

5. A liquid crystal display device according to claim 4; wherein the liquid crystal panel comprises a first glass substrate having a thickness of 0.15 mm to 0.3 mm, a second glass substrate having a thickness of 0.15 mm to 0.3 mm, and a liquid crystal sealed between the first and second glass substrates.

6. A manufacturing method for a liquid crystal display device, comprising the steps:
    placing a translucent first adhesive between a first surface of a substrate and a display surface of a liquid crystal panel so that the first adhesive covers the entire display surface of the liquid crystal panel, and allowing the first adhesive to cure to bond the substrate and the liquid crystal panel to each other;
    positionally aligning the bonded substrate and liquid crystal panel relative to a backlight unit;
    placing a second adhesive between the substrate and the backlight unit so that the second adhesive surrounds an outer peripheral end portion of the liquid crystal panel; and
    curing the second adhesive to integrally bond the substrate and liquid crystal panel to the backlight unit;
    wherein the backlight unit comprises an extended portion having protruding portions; and
    wherein the positionally aligning step comprises positionally aligning the substrate and the backlight unit relative to one another by bringing an end portion of the front substrate into abutment with the protruding portions of the backlight unit.

7. A manufacturing method for a liquid crystal display device according to claim 6; further comprising, prior to the step of placing the first adhesive, the step of positionally aligning the substrate relative to the liquid crystal panel so that a protruding portion of the substrate protrudes outwardly from the entire or a part of the outer peripheral end portion of the liquid crystal panel.

8. A manufacturing method for a liquid crystal display device according to claim 7; wherein during the positionally aligning step, the bonded substrate and liquid crystal panel are positionally aligned relative to the backlight unit by bringing the protruding portion of the substrate into abutment with a protruding portion of the backlight unit.

9. A manufacturing method for a liquid crystal display device according to claim 6; wherein the liquid crystal panel is configured for attachment to a flexible substrate for connection to an external drive circuit; and wherein the step of placing the second adhesive comprises placing the second adhesive so as to surround the outer peripheral end portion of the liquid crystal panel other than a part of the outer peripheral end portion configured for attachment to the flexible substrate.

10. A liquid crystal display device comprising:
a substrate;
a liquid crystal panel having a display surface and being configured for attachment to a flexible substrate that connects to an external drive circuit for supplying a drive signal to the liquid crystal panel;
a translucent first adhesive disposed between a main surface of the substrate and the entire display surface of the liquid crystal panel;
a backlight unit having a main surface mounted to a surface of the liquid crystal panel opposite to the display surface thereof; and
a second adhesive disposed between side surfaces of the liquid crystal panel and the main surfaces of the substrate and the backlight unit to integrally bond the liquid crystal panel, substrate and backlight unit to one another, the second adhesive being disposed on the side surfaces of the liquid crystal panel other than side surfaces to which the flexible substrate is configured to be attached.

* * * * *